(12) United States Patent
Iwanaga

(10) Patent No.: US 7,575,253 B2
(45) Date of Patent: *Aug. 18, 2009

(54) FLUORESCENT IMAGE-PRINTED ARTICLE AND FLUORESCENT INK

(75) Inventor: Hiroki Iwanaga, Yokohama (JP)

(73) Assignee: Kabushik Kaisha Toshiba, Tokyo (JP)

(*) Notice: Subject to any disclaimer, the term of this patent is extended or adjusted under 35 U.S.C. 154(b) by 436 days.

This patent is subject to a terminal disclaimer.

(21) Appl. No.: 11/221,736

(22) Filed: Sep. 9, 2005

(65) Prior Publication Data

US 2006/0063036 A1   Mar. 23, 2006

(30) Foreign Application Priority Data

Sep. 13, 2004   (JP) ............... 2004-264950

(51) Int. Cl.
   *B42D 15/00* (2006.01)
   *C09D 11/00* (2006.01)

(52) U.S. Cl. ............ 283/92; 428/195.1; 428/913; 428/916; 106/31.15; 534/15

(58) Field of Classification Search ......... 428/195.1, 428/913, 916; 283/92, 85; 250/365; 252/301.35; 534/15; 106/31.15
   See application file for complete search history.

(56) References Cited

U.S. PATENT DOCUMENTS

| 1,822,098 | A | * | 9/1931 | Huntress | 428/378 |
| 2,262,492 | A | * | 11/1941 | Farrell | 40/638 |
| 2,368,815 | A | * | 2/1945 | Farrell | 283/92 |
| 3,473,027 | A | * | 10/1969 | Freeman et al. | 250/365 |
| 4,451,521 | A | * | 5/1984 | Kaule et al. | 428/199 |
| 4,627,642 | A | * | 12/1986 | Peronneau et al. | 283/92 |
| 4,891,505 | A | * | 1/1990 | Jalon | 235/491 |
| 4,921,534 | A | * | 5/1990 | Jalon | 106/31.15 |
| 5,028,792 | A | * | 7/1991 | Mullis | 250/474.1 |
| 5,118,349 | A | * | 6/1992 | Jalon | 106/31.15 |
| 5,296,275 | A | * | 3/1994 | Goman et al. | 428/29 |
| 5,435,937 | A | * | 7/1995 | Bell et al. | 252/301.18 |

(Continued)

FOREIGN PATENT DOCUMENTS

JP   2002-173622   6/2002

(Continued)

OTHER PUBLICATIONS

STIC search of formula 1-3 in applicant's claims. performed Jan. 31, 2008 Imported as compoundsearch.pdf.*

(Continued)

*Primary Examiner*—Callie E Shosho
*Assistant Examiner*—Gerard T Higgins
(74) *Attorney, Agent, or Firm*—Oblon, Spivak, McClelland, Maier & Neustadt, P.C.

(57) ABSTRACT

A fluorescent image-printed article including a substrate, and an image formed on the substrate, wherein the image is formed from a fluorescent ink containing a binder, and a fluorescent substance which is dispersed in the binder, is capable of emitting fluorescence when irradiated with ultraviolet rays, and is substantially transparent to visible light, the fluorescent substance being formed of a rare earth complex containing, as a ligand, a compound represented by the following formula (1):

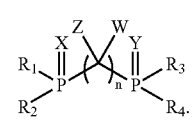

(1)

8 Claims, 4 Drawing Sheets

U.S. PATENT DOCUMENTS

| | | | | |
|---|---|---|---|---|
| 5,516,362 | A * | 5/1996 | Gundjian et al. | 106/31.32 |
| 5,658,494 | A * | 8/1997 | Bell et al. | 252/301.18 |
| 5,702,511 | A * | 12/1997 | de Saint-Romain et al. | 106/31.32 |
| 6,576,155 | B1 * | 6/2003 | Barbera-Guillem | 252/301.36 |
| 6,813,011 | B2 * | 11/2004 | Gardner et al. | 356/71 |
| 7,147,801 | B2 * | 12/2006 | Kozee et al. | 252/301.16 |
| 7,250,117 | B2 * | 7/2007 | Iwanaga et al. | 252/301.16 |
| 2003/0168967 | A1 * | 9/2003 | Ikeda | 313/498 |
| 2004/0245504 | A1 * | 12/2004 | Sage et al. | 252/301.16 |
| 2004/0253477 | A1 * | 12/2004 | Kathirgamanathan et al. | 428/690 |
| 2004/0265631 | A1 | 12/2004 | Iwanaga et al. | |

FOREIGN PATENT DOCUMENTS

JP  2003-26969  1/2003

OTHER PUBLICATIONS

Koide, Yasuhiro et al., New Chiral Lanthanide Complexes with Optically Pure ethanediylbis(t-butylphenylphosphine oxide), Journal of Alloys and Compounds, 192(1993), 211-216 imported as koideref.pdf.*

Hiroki Iwanaga, et al., "Development of Ultraviolet LED Devices Containing Europium (III) Complexes in Fluorescence Layer", Abstracts of Rare Earths '04, FP-77, p. 193.

* cited by examiner

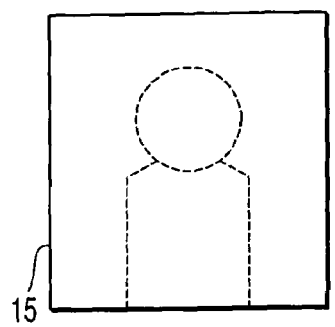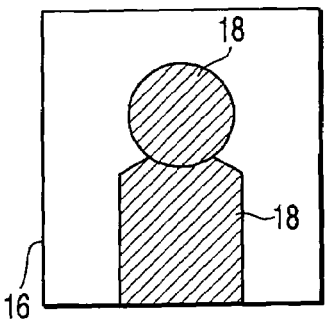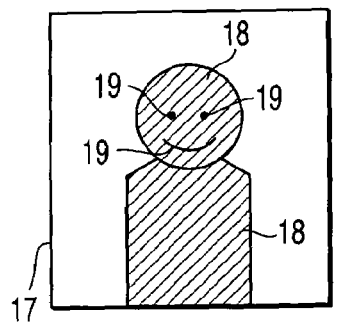
FIG. 6A     FIG. 6B     FIG. 6C
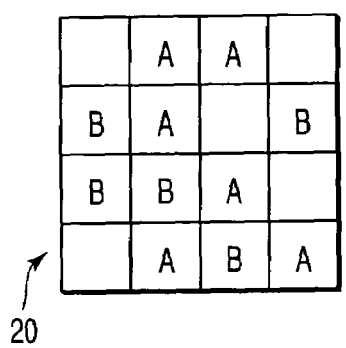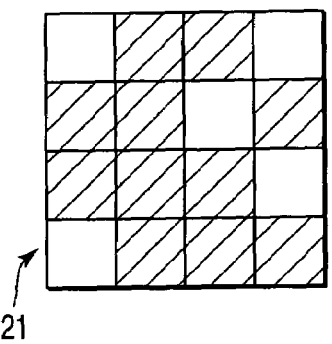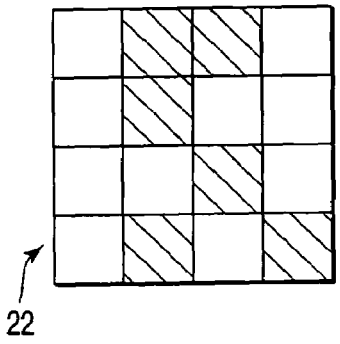
FIG. 7A     FIG. 7B     FIG. 7C
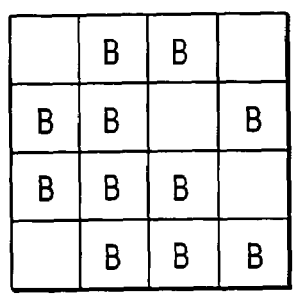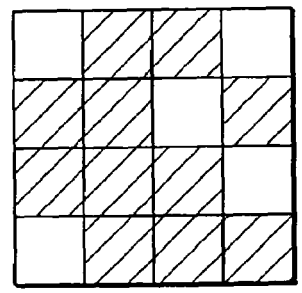
FIG. 8A     FIG. 8B

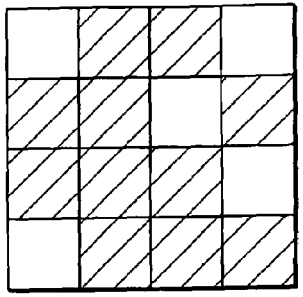
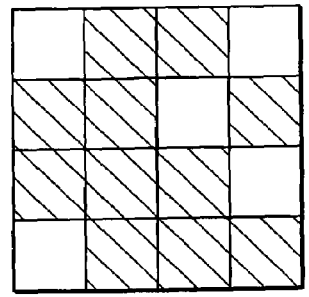
FIG. 9A  FIG. 9B  FIG. 9C
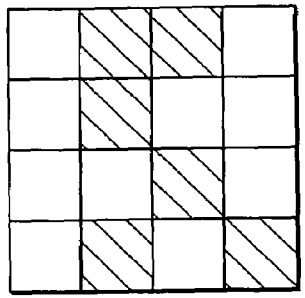
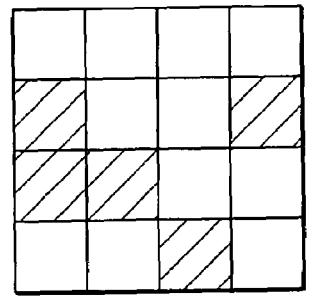
FIG. 10A  FIG. 10B  FIG. 10C

FLUORESCENT IMAGE-PRINTED ARTICLE AND FLUORESCENT INK

CROSS-REFERENCE TO RELATED APPLICATIONS

This application is based upon and claims the benefit of priority from prior Japanese Patent Application No. 2004-264950, filed Sep. 13, 2004, the entire contents of which are incorporated herein by reference.

BACKGROUND OF THE INVENTION

1. Field of the Invention

The present invention relates to a fluorescent image-printed article for security measures, where the image is formed by making use of an ink containing a fluorescent substance which is not visible under visible light but can be made visible under the irradiation of ultraviolet rays through the emission of fluorescent light in the visible region. The present invention also relates to such a fluorescent ink.

2. Description of the Related Art

In recent years, in order to prevent the forgery or duplication of securities, such as notes and prepaid cards so as to enhance the security of using these securities, there has been practiced the printing of microletters or copy-restraining patterns on these securities by making use of an infra-red absorbing ink or a fluorescent ink. Of these inks, the fluorescent ink can be used for printing so-called hidden marks which are hardly visible under the ordinary visible light but can be made detectable through visual observation due to the emission of fluorescence under the irradiation of ultraviolet rays or infrared rays.

In the production of the fluorescent ink, fluorescent pigments are employed in place of organic or inorganic color pigments exhibiting absorption in a visible light region and being used in the ordinary printing inks. The fluorescent ink can be employed in the formation of images on a substrate by means of offset printing or thermal transfer printing in the same manner as in the case of ordinary printing inks.

In order to identify fluorescent images formed on an image-printed article, it is required to irradiate the image-printed article with ultraviolet rays employed as an exciting light. When the image-printed article is irradiated with ultraviolet rays, the ultraviolet rays are absorbed by the fluorescent substance of fluorescent images, thereby causing the emission of fluorescence in the visible region. This fluorescence can be recognized through visual observation or using a camera. As for the wavelength of ultraviolet rays to be irradiated, it can be suitably determined depending on the kinds of fluorescent substance to be employed. Therefore, various kinds of light source can be suitably selected according to the kinds of fluorescent substance.

As for specific examples of such a fluorescent ink, it is proposed, in recent years, to employ rare earth metal complex (see for example JP Laid-open Patent Publication (Kokai) No. 2003-26969 and No. 2002-173622). Fluorescent ink employing a rare earth metal complex is advantageous as compared with the ink employing the conventional inorganic fluorescent substance in the respect that it is possible to suppress light scattering at an image portion formed of the fluorescent ink, thereby making it possible to overcome, to some extent, the problem that the presence of the fluorescent ink can be recognized as an image-printed article is observed under visible light. Further, the fluorescent ink employing the rare earth metal complex is also advantageous in that it is possible to suppress the association of ink in the binder of ink more effectively as compared with the fluorescent ink employing an organic fluorescent substance, so that the fluctuation of luminosity due to working temperature can be more effectively suppressed.

The europium complex described in JP Laid-open Patent Publication (Kokai) No. 2003-26969 is constructed such that only β-diketone ligand is coordinated to europium and the ink composition containing this europium complex is capable of emitting red fluorescence. However, this ink composition is low in luminosity, so that it is now desired to further enhance the luminosity thereof.

Further, the europium complex described in JP Laid-open Patent Publication (Kokai) No. 2002-173622 is constructed such that both β-diketone ligand and phenanthroline ligand are coordinated to europium and the ink composition containing this europium complex is also capable of emitting red fluorescence. However, this europium complex is accompanied with a problem that it is prone to crystallize in the binder of the ink and, due to this crystallization, light scattering is caused to generate at an image portion formed from the europium complex. As a result, the presence of the fluorescent ink is made recognizable as an image-printed article having such an image portion is as seen under visible light, thus failing to sufficiently solve the problem of deterioration of security level.

BRIEF SUMMARY OF THE INVENTION

An object of the present invention is to provide a fluorescent ink which is high in luminosity and is substantially free from light scattering even under visible light, thereby making an image formed from the fluorescent ink hardly recognizable under visible light.

Another object of the present invention is to provide a fluorescent image-printed article where the above-mentioned fluorescent ink is employed for forming the image thereof to enhance the security level of the article.

According to a first aspect of the present invention, there is provided a fluorescent image-printed article comprising a substrate, and an image formed on the substrate, wherein the image is formed from a fluorescent ink including a binder, and a fluorescent substance which is dispersed in the binder, is capable of emitting fluorescence when irradiated with ultraviolet rays, and is substantially transparent to visible light; the fluorescent substance being formed of a rare earth complex containing, as a ligand, a compound represented by the following formula (1):

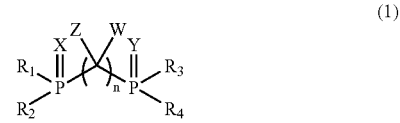

(1)

(wherein, X and Y are the same or different and are individually an element selected from the group consisting of O, S and Se; $R_1$-$R_4$ are the same or different but not all of the $R_1$-$R_4$ are the same and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from the group consisting of a hydrogen atom, deuterium atom, halogen atom, and an alkyl group).

According to a second aspect of the present invention, there is provided a fluorescent image-printed article comprising a substrate, and an image formed on the substrate, wherein the image is formed from a fluorescent ink including a binder, and a fluorescent substance which is dispersed in the binder, is capable of emitting fluorescence when irradiated with ultraviolet rays, and is substantially transparent to visible light; the fluorescent substance being formed of a rare earth complex represented by the following formula (2):

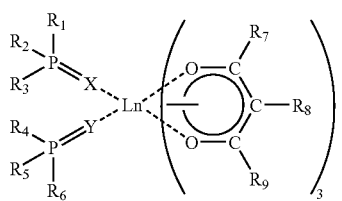

(2)

(wherein, Ln is a rare earth element; X and Y are the same or different and are individually an element selected from the group consisting of O, S and Se; $R_1$-$R_6$ are the same or different but the combination of $R_1$-$R_3$ is not the same as the combination of $R_4$-$R_6$, and are individually a linear or branched alkyl or alkoxy group having not more than 20 carbon atoms, a phenyl group, biphenyl group, naphthyl group, heterocyclic group, or substituted groups thereof; $R_7$ and $R_9$ are the same or different and are individually a linear or branched alkyl or alkoxy group, phenyl group, biphenyl group, naphthyl group, heterocyclic group, or substituted groups thereof; and R8 is a halogen atom, deuterium atom, or a linear or branched aliphatic group having 1-22 carbon atoms).

According to a third aspect of the present invention, there is provided a fluorescent image-printed article comprising a substrate, and an image formed on the substrate, wherein the image is formed from a fluorescent ink including a binder, and a first fluorescent substance and a second fluorescent substance both dispersed in the binder, both capable of emitting fluorescence when irradiated with ultraviolet rays, and both substantially transparent to visible light; the first fluorescent substance is a europium complex which is capable of emitting a fluorescence having a wavelength of a first visible light region when irradiated with ultraviolet rays of a first wavelength; and the second fluorescent substance is a terbium complex which is capable of emitting a fluorescence having a wavelength of a second visible light region differing in wavelength from that of the first visible light region when irradiated with ultraviolet rays of a second wavelength; at least one of the first fluorescent substance and the second fluorescent substance being formed of a rare earth complex containing, as a ligand, a compound represented by the following formula (1):

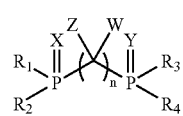

(1)

(wherein, X and Y are the same or different and are individually an element selected from the group consisting of O, S and Se; $R_1$-$R_4$ are the same or different but not all of the $R_1$-$R_4$ are the same and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from the group consisting of a hydrogen atom, deuterium atom, halogen atom and alkyl group).

According to a fourth aspect of the present invention, there is provided a fluorescent image-printed article comprising a substrate, and an image formed on the substrate, wherein the image is formed from a fluorescent ink including a binder, and a first fluorescent substance and a second fluorescent substance both dispersed in the binder, both capable of emitting fluorescence when irradiated with ultraviolet rays, and both substantially transparent to visible light; the first fluorescent substance is an europium complex which is capable of emitting a fluorescence having a wavelength of a first visible light region when irradiated with ultraviolet rays of a first wavelength; and the second fluorescent substance is a terbium complex which is capable of emitting a fluorescence having a wavelength of a second visible light region differing in wavelength from that of the first visible light region when irradiated with ultraviolet rays of a second wavelength; at least one of the first fluorescent substance and the second fluorescent substance being formed of a rare earth complex which is represented by the following formula (2):

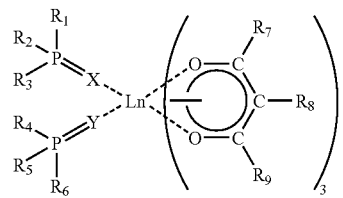

(2)

(wherein, Ln is europium or terbium; X and Y are the same or different and are individually an element selected from the group consisting of O, S and Se; $R_1$-$R_6$ are the same or different but the combination of $R_1$-$R_3$ is not the same as the combination of $R_4$-$R_6$, and are individually a linear or branched alkyl or alkoxy group having not more than 20 carbon atoms, a phenyl group, biphenyl group, naphthyl group, heterocyclic group, or substituted groups thereof; R7 and R9 are the same or different and are individually a linear or branched alkyl or alkoxy group, a phenyl group, biphenyl group, naphthyl group, heterocyclic group, or substituted groups thereof; and R8 is a halogen atom, deuterium atom, or a linear or branched aliphatic group having 1-22 carbon atoms).

According to a fifth aspect of the present invention, there is provided a fluorescent image-printed article comprising a substrate, and an image formed on the substrate, wherein the image is formed from a fluorescent ink including a binder, and a fluorescent substance which is dispersed in the binder, capable of emitting fluorescence when irradiated with ultraviolet rays, and substantially transparent to visible light; the fluorescent substance is capable of emitting a fluorescence having a wavelength of a first visible light region when irradiated with ultraviolet rays of a first wavelength and also capable of emitting a fluorescence having a wavelength of a second visible light region differing in wavelength from that of the first visible light region when irradiated with ultraviolet rays of a second wavelength; the fluorescent substance being formed of a binuclear complex wherein europium and terbium are both bonded to a common ligand represented by the following formula (3):

(3)

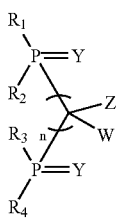

(wherein, X and Y are the same or different and are individually an element selected from the group consisting of O, S and Se; $R_1$-$R_4$ are the same or different and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from the group consisting of a hydrogen atom, deuterium atom, halogen atom and alkyl group).

According to a sixth aspect of the present invention, there is provided a fluorescent ink comprising a binder, and a fluorescent substance which is dispersed in the binder, is capable of emitting fluorescence when irradiated with ultraviolet rays, and is substantially transparent to visible light; the fluorescent substance being formed of a rare earth complex containing, as a ligand, a compound represented by the following formula (1):

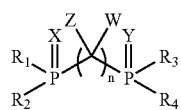
(1)

(wherein, X and Y are the same or different and are individually an element selected from the group consisting of O, S and Se; $R_1$-$R_4$ are the same or different but not all of the $R_1$-$R_4$ are the same and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from the group consisting of a hydrogen atom, deuterium atom, halogen atom and alkyl group).

According to a seventh aspect of the present invention, there is provided a fluorescent ink comprising a binder, and a fluorescent substance which is dispersed in the binder, is capable of emitting fluorescence when irradiated with ultraviolet rays, and is substantially transparent to visible light; the fluorescent substance being formed of a rare earth complex represented by the following formula (2):

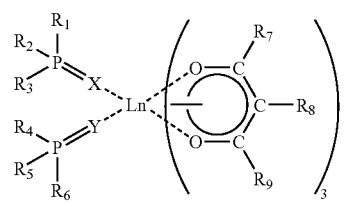
(2)

(wherein, Ln is a rare earth element; X and Y are the same or different and are individually an element selected from the group consisting of O, S and Se; $R_1$-$R_6$ are the same or different but the combination of $R_1$-$R_3$ is not the same as the combination of $R_4$-$R_6$, and are individually a linear or branched alkyl or alkoxy group having not more than 20 carbon atoms, a phenyl group, biphenyl group, naphthyl group, heterocyclic group, or substituted groups thereof; $R_7$ and $R_9$ are the same or different and are individually a linear or branched alkyl or alkoxy group, a phenyl group, biphenyl group, naphthyl group, heterocyclic group, or substituted groups thereof; and R8 is a halogen atom, deuterium atom, or a linear or branched aliphatic group having 1-22 carbon atoms).

According to an eighth aspect of the present invention, there is provided a fluorescent ink comprising a binder, and a fluorescent substance which is dispersed in the binder, capable of emitting fluorescence when irradiated with ultraviolet rays, and substantially transparent to visible light; wherein the fluorescent substance is capable of emitting a fluorescence having a wavelength of a first visible light region when irradiated with ultraviolet rays of a first wavelength and also capable of emitting a fluorescence having a wavelength of a second visible light region differing in wavelength from that of the first visible light region when irradiated with ultraviolet rays of a second wavelength; the fluorescent substance being formed of a binuclear complex wherein europium and terbium are both bonded to a common ligand represented by the following formula (3):

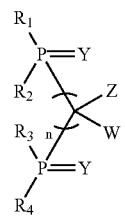
(3)

(wherein, X and Y are the same or different and are individually an element selected from the group consisting of O, S and Se; $R_1$-$R_4$ are the same or different and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from the group consisting of a hydrogen atom, deuterium atom, halogen atom and alkyl group).

BRIEF DESCRIPTION OF THE SEVERAL VIEWS OF THE DRAWING

FIGS. 6A-6C are plan views each illustrating a further example of preventing forgery where the fluorescent image-printed article according to third and fourth embodiments of the present invention is employed;

FIGS. 7A-7C are plan views each illustrating a further example of preventing forgery where the fluorescent image-printed article according to a sixth embodiment of the present invention is employed;

FIGS. 8A and 8B are plan views each illustrating a further example of preventing forgery;

FIGS. 9A-9C are plan views each illustrating a further example of preventing forgery where the fluorescent image-printed article according to an eighth embodiment of the present invention is employed; and FIGS. 10A-10C are plan views each illustrating a further example of preventing forgery where the fluorescent image-printed article according to a ninth embodiment of the present invention is employed.

DETAILED DESCRIPTION OF THE INVENTION

Figure 1:
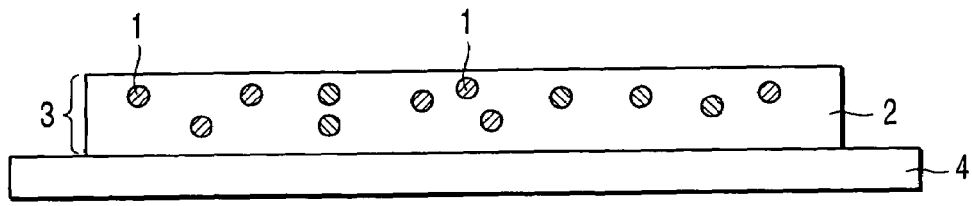
FIG. 1 is a cross-sectional view illustrating a fluorescent image-printed article according to a first embodiment of the present invention.

The fluorescent image-printed article according to the first aspect of the present invention is an article having so-called hidden marks printed thereon which are hardly visible under ordinary visible light but can be made detectable through visual observation under the irradiation of ultraviolet rays. These hidden marks are utilized for the purpose of enhancing the security assurance and employed in securities such as money vouchers and prepaid cards or in printed matters which are required to be prevented from being forged or duplicated in order to keep secret any information written therein. The first fluorescent ink is employed for this kind of printing.

The rare earth complex to be employed as fluorescent substance in the fluorescent image-printed article according to the first aspect of the present invention and in the first fluorescent ink is a compound where a phosphorus compound of specific structure is coordinated to a rare earth metal. In this rare earth complex, the structure of the ligand is asymmetric and hence the ligand field becomes more asymmetric, resulting in enhancement of the molecular extinction coefficient, thus increasing the luminosity. Therefore, the fluorescent substance made from this rare earth complex is high in luminosity when it is irradiated with ultraviolet rays.

In addition to these characteristics, due to the asymmetry of the structure of the ligand, this rare earth complex is not associated or crystallized in a binder and hence is excellent in dispersibility in a binder. Because of this, even in a printed state on a substrate, this fluorescent substance can be kept in an amorphous state in a binder, thus making it excellent in transparency. Accordingly, the existence of fluorescent ink in a fluorescent image-printed article can be hardly recognized even if the fluorescent image-printed article is observed under visible light. Because of this advantage, this rare earth complex is useful in enhancing the security level of fluorescent image-printed articles.

Further, the rare earth complex to be employed as a fluorescent substance in the fluorescent image-printed article according to the second aspect of the present invention and in the second fluorescent ink is a compound in which a phosphorus compound of specific structure is coordinated to a rare earth metal. In this rare earth complex, the structure of the ligand is asymmetric as in the case of fluorescent substance of the first fluorescent ink to be employed in the fluorescent image-printed article according to the first aspect of the present invention and hence the ligand field becomes more asymmetric, resulting in enhancement of the molecular extinction coefficient, thus increasing the luminosity. Therefore, the fluorescent substance made from this rare earth complex is high in luminosity when it is irradiated with ultraviolet rays.

In addition to these characteristics, due to the asymmetry of the structure of the ligand, this rare earth complex is not associated or crystallized in a binder and hence is excellent in dispersibility in a binder. Because of this, even in a printed state on a substrate, this fluorescent substance can be kept in an amorphous state in a binder, thus making it excellent in transparency. Accordingly, the existence of fluorescent ink in a fluorescent image-printed article can be hardly recognized even if the fluorescent image-printed article is observed under visible light. Because of this advantage, this rare earth complex is useful in enhancing the security level of fluorescent image-printed articles.

In the case of the fluorescent image-printed articles according to the third and fourth aspects of the present invention, the image is formed from two kinds of rare earth complexes so that the wavelength region of ultraviolet rays to be irradiated for enabling one of these fluorescent substances to emit differs from the wavelength region of ultraviolet rays to be irradiated for enabling the other fluorescent substance. Accordingly, the wavelength region of fluorescence to be emitted from each of these fluorescent substances also differs from each other. Namely, the fluorescent image-printed article in this case is capable of emitting plural kinds of fluorescence through the irradiation of plural kinds of ultraviolet rays differing in wavelength. For example, a fluorescent image can be created in such a manner that even if ultraviolet rays having a wavelength of 410 nm are irradiated to the image, the first fluorescent substance is prevented from emitting fluorescence and only the second fluorescent substance is permitted to emit red fluorescence, and if ultraviolet rays having a wavelength of 365 nm are irradiated to the image, not only the second fluorescent substance but also the first fluorescent substance is permitted to emit fluorescence, thereby generating fluorescence of mixed colors to be derived from both fluorescent substances. In this case, even if it is possible for a forger to forge a fluorescent image-printed article by making use of a fluorescent substance which is capable of emitting a red image when irradiated with ultraviolet rays having a wavelength of 410 nm, the forgery thereof can be easily revealed by an inspector by irradiating the fluorescent image-printed article with two kinds of ultraviolet rays having wavelengths of 410 nm and 365 nm.

In the above case, since the fluorescent image-printed article is forged by a forger by following the image of fluorescence that can be created through the irradiation of ultraviolet rays of 410 nm, it is possible to determine the forgery through the irradiation of ultraviolet rays of 365 nm to see if each color or mixed colors of these fluorescent substances can be emitted. Incidentally, it is possible to further enhance the forgery-preventing effect by printing a combination of images on a fluorescent image-printed article, each image being created by making use of a different kind of ink containing a different kind of rare earth complex.

As in the cases of the aforementioned first and second fluorescent inks, the fluorescent substances to be employed in the fluorescent image-printed articles according to the third and fourth aspects of the present invention are high in luminosity as they are irradiated with ultraviolet rays. Additionally, the existence of fluorescent ink in a fluorescent image-printed article cannot be recognized or made visible even if the fluorescent image-printed article is observed under visible light. Because of this advantage, this rare earth complex is useful in enhancing the security level of fluorescent image-printed articles.

Further, when a europium (Eu) complex and terbium (Tb) complex are selected as rare earth complexes to be included in the first and second fluorescent inks, since they are capable of emitting strong fluorescence when irradiated with ultraviolet rays, and since the hue of emission differs prominently between them (while the europium complex is capable of emitting a red color when irradiated with ultraviolet rays of 365 nm-410 nm, the terbium complex is capable of emitting a green color when irradiated with ultraviolet rays of around 365 nm), identification can be enhanced.

A third fluorescent ink to be employed in the fluorescent image-printed article according to the fifth aspect of the present invention contains a binuclear complex comprising two kinds of rare earth complexes. As in the cases of the fluorescent image-printed articles of the third and fourth aspects of the present invention, this binuclear complex is enabled to emit plural kinds of fluorescence from a single molecule thereof when irradiated with plural kinds of ultraviolet rays differing in wavelength. Namely, by making use of a fluorescent ink containing this binuclear complex, it is possible to obtain a fluorescent image-printed article which is high in security level and is capable of emitting different kinds of fluorescence when irradiated with plural kinds of ultraviolet rays differing in wavelength.

In particular, the fluorescent substance to be employed in the fluorescent image-printed article according to the fifth aspect of the present invention and in the third fluorescent ink is a binuclear complex which is linked via a specific kind of ligand. Because of this, it is possible to effectively inhibit the generation of a phenomenon where the transfer of energy occurs between different kinds of fluorescent molecules when two of more kinds of fluorescent substances are mixed together.

This binuclear complex is featured in that it is not associated or crystallized in a binder, and hence is excellent in dispersibility in a binder. Because of this, even in a printed state on a substrate, this fluorescent substance can be kept in an amorphous state in a binder, thus making it excellent in transparency. Accordingly, the existence of fluorescent ink in a fluorescent image-printed article can be hardly recognized even if the fluorescent image-printed article is observed under visible light. Because of this advantage, it is possible, through the employment of this fluorescent substance, to enhance the security level of fluorescent image-printed articles.

Next, various embodiments of the present invention will be explained with reference to the drawings.

FIG. 1 shows a cross-sectional view of a fluorescent image-printed article according to the first embodiment of the present invention. Referring to FIG. 1, the fluorescent image-printed article is constructed such that an image 3 is formed on a substrate 4, wherein the image 3 is formed using a fluorescent ink comprising a binder 2 in which a fluorescent substance 1 is dispersed.

The fluorescent substance 1 employed in the fluorescent image-printed article according to the first embodiment of the present invention is constituted by a rare earth complex containing, as a ligand, a compound represented by the following formula (1):

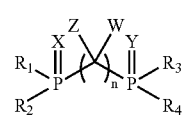

(1)

(wherein, X and Y are the same or different and are individually an element selected from the group consisting of O, S and Se; $R_1$-$R_4$ are the same or different but not all of the $R_1$-$R_4$ are the same and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from the group consisting of a hydrogen atom, deuterium atom, halogen atom, and an alkyl group).

In this case in particular, not all of the $R_1$-$R_4$ are the same. Namely, it is important that the rare earth complex has a ligand of an asymmetric structure in order to obtain the aforementioned desirable effects of the present invention.

Further, since it is possible to prominently increase the luminosity, it is especially preferable that the rare earth complex contains the ligand represented by the aforementioned formula (1) and β-diketone ligand. As for examples of such a rare earth complex, it is possible to employ a compound represented by the following formula (4).

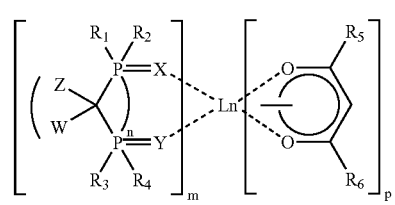

(4)

(wherein, Ln is a rare earth element; X and Y are the same or different and are individually an element selected from the group consisting of O, S and Se; $R_1$-$R_6$ are the same or different but not all of the $R_1$-$R_4$ are the same, and are individually a linear or branched alkyl or alkoxy group having not more than 20 carbon atoms, a phenyl group, biphenyl group, naphthyl group, heterocyclic group, or substituted groups thereof; n is an integer of 2-20; m and p are respectively an integer of 1-5; and Z and W are the same or different and are individually an atom or a group selected from the group consisting of a hydrogen atom, deuterium atom, halogen atom, and an alkyl group).

In the formula (4), the hydrogen atom (H) located between $R_5$ and $R_6$ may be substituted by a deuterium atom (D), halogen atom. If this hydrogen atom is substituted by a deuterium atom (D), or halogen atom, the stability of the ligand can be enhanced.

Figure 2:
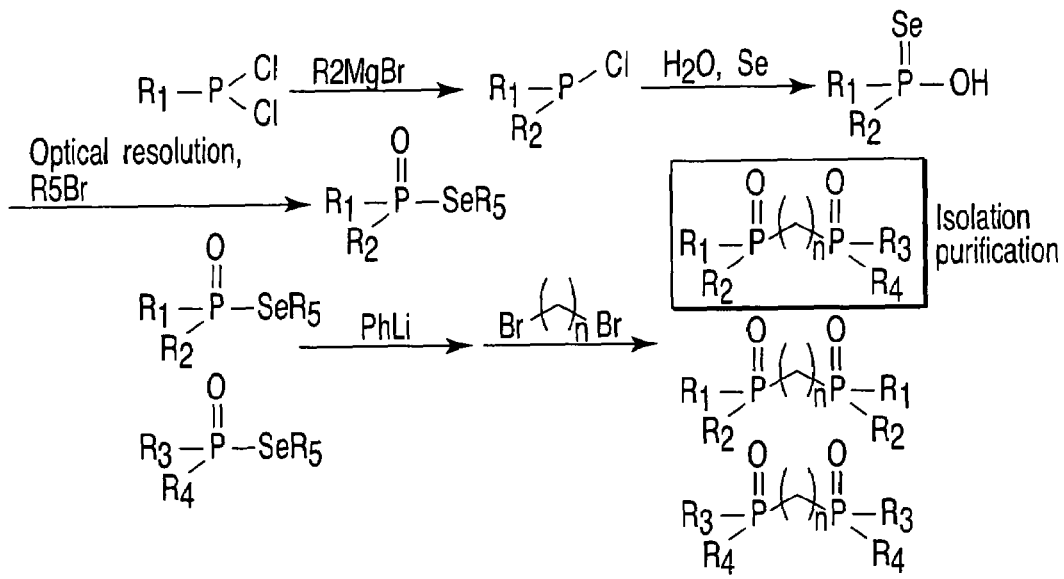
FIG. 2 shows a reaction formula for forming a ligand of rare earth complex to be employed in the manufacture of the fluorescent image-printed article according to the first embodiment of the present invention.

The ligand constituted by the phosphorous compound represented by the aforementioned formula (1) may be constituted by a chiral (optically active). The ligand constituted by a chiral (optically active) phosphorus compound can be obtained through a reaction as shown in FIG. 2 for example. A phosphorus compound which is not optically active can be also obtained according to a method similar to the method shown in FIG. 2.

By mixing the ligand obtained in this manner and other kinds of ligand with, and coordinated to, a rare earth element, it is possible to obtain a fluorescent substance to be incorporated into a fluorescent ink.

As for specific examples of the rare earth element to which the compound represented by the aforementioned formula (1) or of rare earth element Ln, it is possible to employ europium (Eu), terbium (Tb), and gadolinium (Gd). It is especially preferable to employ europium and terbium, since they are high in luminosity. A europium (Eu) complex is capable of emitting red fluorescence when irradiated with ultraviolet rays having a wavelength ranging from 365 nm to 410 nm. On the other hand, although terbium (Tb) is capable of emitting green fluorescence when irradiated with ultraviolet rays having a wavelength of 365 nm, terbium is not capable of emitting fluorescence even if it is irradiated with ultraviolet rays having a wavelength of 410 nm or so.

Next, the fluorescent image-printed article according to the second embodiment of the present invention and the fluorescent ink to be employed in the fluorescent image-printed article will be explained.

The fluorescent substance to be employed in the fluorescent image-printed article according to the second embodiment of the present invention is constituted by a rare earth complex represented by the following formula (2):

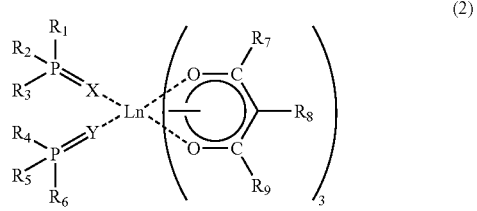

(2)

(wherein, Ln is a rare earth element; X and Y are the same or different and are individually an element selected from the group consisting of O, S and Se; $R_1$-$R_6$ are the same or different but the combination of $R_1$-$R_3$ is not the same as the combination of $R_4$-$R_6$ and are individually a linear or branched alkyl or alkoxy group having not more than 20 carbon atoms, a phenyl group, biphenyl group, naphthyl group, heterocyclic group, or substituted groups thereof; $R_7$ and $R_9$ are the same or different and are individually a linear or branched alkyl or alkoxy group, phenyl group, biphenyl group, naphthyl group, heterocyclic group, or substituted groups thereof; and $R_8$ is a halogen atom, deuterium atom, or a linear or branched aliphatic group having 1-22 carbon atoms).

As described above, the combination of $R_1$-$R_3$ should not be the same as the combination of $R_4$-$R_6$. Namely, it is important that the rare earth complex is asymmetric in structure to the molecular axis thereof in order to obtain the aforementioned desirable effects of the present invention.

The hydrogen atom of $R_1$-$R_9$ may be substituted by a deuterium atom or halogen atom. As for the halogen, the employment of fluorine is especially preferable. The reason for this is that fluorine is capable of preventing the deactivation due to vibration of the C—H bond. Further, in the case of fluorine, the effects of steric hindrance becomes large, so that it is possible to prevent impurities from coordinating to a rare earth element. Further, when a C—H bond or O—H bond is included in a polymer in which a rare earth complex is dispersed, a distance between a central rare earth element and the C—H or O—H bond is caused to increase due to the effects of steric hindrance, thereby making it possible to prevent the deactivation due to vibration of the C—H bond or OH bond.

As for specific examples of the rare earth element Ln in the aforementioned formula (2), it is possible to employ europium (Eu), terbium (Tb), and gadolinium (Gd). It is especially preferable to employ europium and terbium, since they are high in luminosity. A europium (Eu) complex is capable of emitting red fluorescence when irradiated with ultraviolet rays having a wavelength ranging from 365 nm to 410 nm. On the other hand, although terbium (Tb) is capable of emitting green fluorescence when irradiated with ultraviolet rays having a wavelength of 365 nm, terbium is almost incapable of emitting fluorescence even if it is irradiated with ultraviolet rays having a wavelength of 410 nm or so.

The rare earth complex shown in the aforementioned formula (2) can be obtained by a method wherein two kinds of phosphorus compounds differing in structure and to be employed as a ligand are mixed with a rare earth complex having only β-diketone as a ligand.

Next, the fluorescent image-printed articles according to the third and fourth embodiments of the present invention will be explained.

The fluorescent image-printed articles according to the third and fourth embodiments of the present invention are constructed such that the fluorescent image thereof is formed by making use of a fluorescent ink comprising at least two kinds of fluorescent substances which are substantially transparent to visible light and dispersed in a binder.

Figure 3:
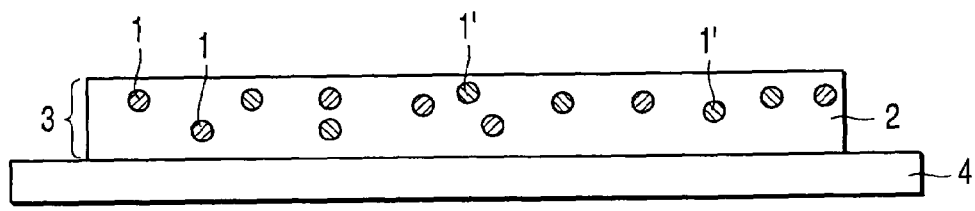
FIG. 3 is a cross-sectional view illustrating a fluorescent image-printed article according to third and fourth embodiments of the present invention.

FIG. 3 is a cross-sectional view illustrating a fluorescent image-printed article according to the third and fourth embodiments of the present invention. An image 3 is formed on a substrate 4 wherein the image 3 is formed using a fluorescent ink comprising a first fluorescent substance 1 and a second fluorescent substance 1' which are dispersed in a binder 2. The first fluorescent substance 1 is substantially transparent to visible light and is capable of emitting fluorescence having a wavelength of a first visible light region when irradiated with ultraviolet rays of a first wavelength. The second fluorescent substance 1' is substantially transparent to visible light and is capable of emitting fluorescence having a wavelength of a second visible light region differing in wavelength from that of the first visible light region when irradiated with ultraviolet rays of a second wavelength.

When this fluorescent image-printed article is irradiated with ultraviolet rays which is capable of exciting any one of the first fluorescent substance 1 and the second fluorescent substance 1' but incapable of exciting the other, only one of these fluorescent substances emits fluorescence, thus the color of this fluorescence can be made different from the color that can be emitted when this fluorescent image-printed article is irradiated with ultraviolet rays having a wavelength which is capable of exciting the other fluorescent substance.

As described above, according to the fluorescent image-printed articles of the third and fourth embodiments of the present invention, it is possible to form various images differing in wavelength region of fluorescence, i.e. differing in fluorescence color to be emitted therefrom by altering the irradiating wavelength of ultraviolet rays, thereby making it possible to enhance forge-preventing property of fluorescent image-printed articles.

In the fluorescent image-printed article of the third embodiment of the present invention, the first fluorescent substance is europium (Eu) and the second fluorescent substance is terbium (Tb). Further, among these first and second fluorescent substances, at least one of them is formed of a rare earth complex containing, as a ligand, a compound represented by the aforementioned formula (1). The rare earth complex having a ligand which is constituted by a compound represented by the aforementioned formula (1) is the same in all respects as explained above with reference to the first fluorescent image-printed article and the first fluorescent ink except that the rare earth element is confined to specific kinds. It is more preferable, in view of further enhancing the effects of the present invention, to formulate both of the first fluorescent substance and the second fluorescent substance by making use of a rare earth complex containing, as a ligand, a compound represented by the aforementioned formula (1).

A europium (Eu) complex is capable of emitting red fluorescence when irradiated with ultraviolet rays having a wavelength ranging from 365 nm to 410 nm. On the other hand, although terbium (Tb) is capable of emitting green fluorescence when irradiated with ultraviolet rays having a wavelength of 365 nm, terbium is almost incapable of emitting fluorescence even if it is irradiated with ultraviolet rays having a wavelength of 410 nm or so. Therefore, when irradiated with ultraviolet rays having a wavelength of 365 nm, both fluorescent substances are enabled to emit fluorescence. Whereas, when irradiated with ultraviolet rays having a wavelength of 410 nm, only the fluorescent substance containing Eu emits fluorescence.

In the fluorescent image-printed article of the fourth embodiment of the present invention, the first fluorescent substance and the second fluorescent substance are selected so as to meet the two conditions that the first fluorescent substance is europium (Eu) and the second fluorescent substance is terbium (Tb), and that at least one of them is selected from a rare earth complex represented by the aforementioned formula (2). The rare earth complex represented by the formula (2) may be the same in all respects as explained above with reference to the second fluorescent image-printed article and the second fluorescent ink except that the rare earth element Ln is confined to europium or terbium. It is more preferable, in view of further enhancing the effects of the present invention, that the first fluorescent substance and the second fluorescent substance are both selected from the rare earth complex represented by the aforementioned formula (2).

A europium (Eu) complex is capable of emitting red fluorescence when irradiated with ultraviolet rays having a wavelength ranging from 365 nm to 410 nm. On the other hand, although terbium (Tb) is capable of emitting green fluorescence when irradiated with ultraviolet rays having a wavelength of 365 nm, terbium is almost incapable of emitting fluorescence even if it is irradiated with ultraviolet rays having a wavelength of 410 nm or so. Therefore, when irradiated with ultraviolet rays having a wavelength of 365 nm, both fluorescent substances are enabled to emit fluorescence. Whereas, when irradiated with ultraviolet rays having a wavelength of 410 nm, only the fluorescent substance containing Eu emits fluorescence.

Incidentally, in addition to the combinations of rare earth complexes, such as a combination of a europium complex and a terbium complex, it is also possible employ a combination of a europium complex and a green-emitting fluorescent substance which is not a complex, or a combination of a terbium complex and a red-emitting fluorescent substance which is not a complex.

In the case of the fluorescent image-printed articles according to the third and fourth embodiments of the present invention, the first fluorescent substance and the second fluorescent substance may be applied to the same region in an overlapped manner or to separate regions in the formation of a fluorescent image. Specific examples of applying these fluorescent substances will be explained with reference to FIGS. 4A to 6C.

Figure 4A:
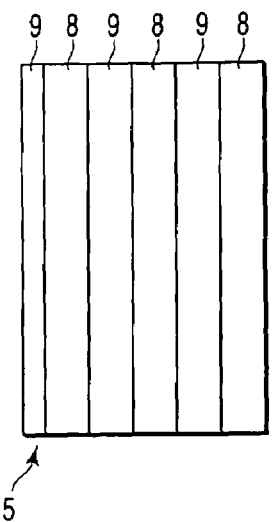
FIGS. 4A-4C are plan views each illustrating one example of preventing forgery where the fluorescent image-printed article according to third and fourth embodiments of the present invention is employed.
Figure 4B:
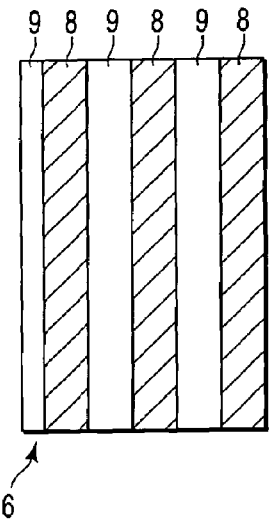
Figure 4C:
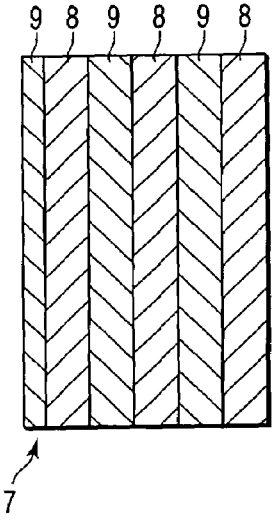

As shown in FIGS. 4A to 4C for example, by making use of two kinds of fluorescent inks, i.e. one containing a first fluorescent substance which is capable of emitting fluorescence when irradiated with ultraviolet rays having a first wavelength or with ultraviolet rays having a second wavelength, and the other containing a second fluorescent substance which is incapable of emitting fluorescence when irradiated with ultraviolet rays having a first wavelength but capable of emitting fluorescence when irradiated with ultraviolet rays having a second wavelength, fluorescence regions 8 containing the first fluorescent substance and fluorescence regions 9 containing the second fluorescent substance are separately printed on a substrate to produce a fluorescent image-printed article having a bar-code-like pattern. In FIGS. 4A to 4C, the images 5, 6 and 7 in these fluorescent image-printed articles are all formed of the same pattern.

The image 5 represents a state of image which can be visually recognized when irradiated with visible light, the image 6 represents a state of image which can be visually recognized when irradiated with ultraviolet rays having a first wavelength, and the image 7 represents a state of image which can be visually recognized when irradiated with ultraviolet rays having a second wavelength, wherein the shadowed portions indicate that the fluorescent regions 8 and 9 are in a fluorescence-emitting state.

In FIGS. 4A to 4C, the image 5 under the irradiation of visible light, the image 6 under the irradiation of ultraviolet rays having a first wavelength, and the image 7 under the irradiation of ultraviolet rays having a second wavelength are all clearly differentiated from each other. Therefore, if a fluorescent image-printed article is constructed such that the genuineness thereof can be determined only when it is irradiated with a combination of specific ultraviolet rays of different wavelength, forgery thereof where the fluorescent printing thereof is made by making use of only one kind of fluorescent substance can be easily revealed. At the same time, the forgery of this fluorescent image-printed article would become difficult.

Figure 5A:
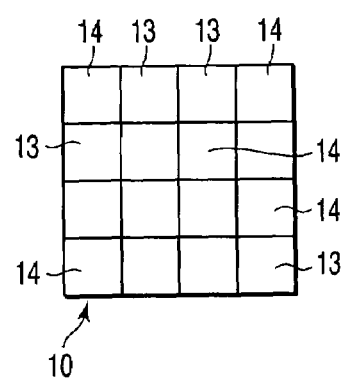
FIGS. 5A-5C are plan views each illustrating another example of preventing forgery where the fluorescent image-printed article according to third and fourth embodiments of the present invention is employed.
Figure 5B:
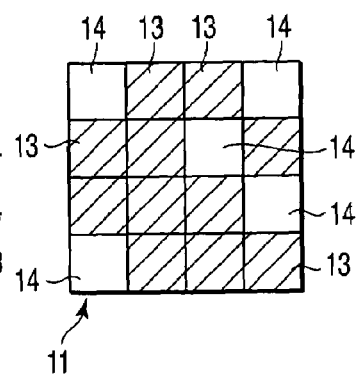
Figure 5C:
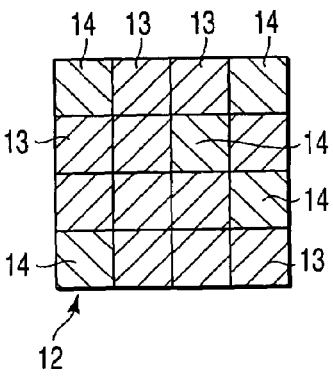

As for the image, it can be variously modified other than with a bar code. For example, as shown in FIGS. 5A to 5C, it can be made into a dot matrix-like configuration as indicated by the images 10, 11 and 12, which are constituted by a fluorescent region 13 containing the aforementioned first fluorescent substance and a fluorescent region 14 containing the aforementioned second fluorescent substance.

Further, it is also possible to form photographic images 15, 16 and 17 where specific kinds of color are made invisible as shown in FIGS. 6A to 6C. These decolorizable portions can be made by making use of two kinds of fluorescent inks, i.e. one containing a first fluorescent substance which is capable of emitting fluorescence when irradiated with ultraviolet rays having a first wavelength or with ultraviolet rays having a second wavelength, and the other containing a second fluorescent substance which is incapable of emitting fluorescence when irradiated with ultraviolet rays having a first wavelength but capable of emitting fluorescence when irradiated with ultraviolet rays having a second wavelength. In this case, regions 18 where only one kind of fluorescent ink (for example, ink containing the first fluorescent substance) is employed for the printing thereof, and regions 19 where two kinds of fluorescent ink (for example, ink containing the first fluorescent substance and ink containing the second fluorescent substance) are employed, in an overlapped manner, for the printing thereof are formed. In the case of this image created in this manner, since the image 15 is decolorized under visible light, the image 15 is incapable of functioning as a certificate image under this condition. The image 16 to be formed under the irradiation of ultraviolet rays having a first wavelength is also difficult to visually recognize. Only the image 17 to be formed under the irradiation of a predetermined ultraviolet rays having a second wavelength is capable of giving a clear image which can be visually recognize.

Next, the fluorescent image-printed article according to the fifth embodiment of the present invention will be explained. This fluorescent image-printed article is formed using a third fluorescent ink.

While the fluorescent image-printed article according to the third and fourth embodiments of the present invention is formed by making use of a first fluorescent substance 1 which is substantially transparent to visible light and is capable of emitting fluorescence having a wavelength of a first visible light region when irradiated with ultraviolet rays of a first wavelength, and a second fluorescent substance which is substantially transparent to visible light and is capable of emitting fluorescence having a wavelength of a second visible light region differing in wavelength from that of the first visible light region when irradiated with ultraviolet rays of a second wavelength, the fluorescent substance to be included in the third fluorescent ink to be employed in the fluorescent image-printed article according to the fifth embodiment of the present invention is formed of a binuclear complex containing two or more kinds of rare earth metals in a single molecule thereof, these rare earth metals being linked to each other through a single ligand. This binuclear complex is featured in that a single molecule thereof emits fluorescence having a wavelength of a first visible light region when irradiated with ultraviolet rays having a first wavelength and also enabled to emit fluorescence having a wavelength of a second visible light region differing in wavelength from the first visible light region when irradiated with ultraviolet rays having a second wavelength.

When this fluorescent image-printed article according to the fifth embodiment of the present invention is irradiated with ultraviolet rays which is capable of exciting any one of the first fluorescent substance and the second fluorescent substance, only one of these fluorescent substances emits fluorescence so that the color of this fluorescence can be made different from the color that can be emitted when this fluorescent image-printed article is irradiated with ultraviolet rays having a wavelength which is capable of exciting the other fluorescent substance. It is possible in this manner to produce various kinds of fluorescent inks each capable of emitting fluorescence differing in wavelength region thereof, i.e. differing in fluorescence color to be emitted therefrom by altering the irradiating wavelength of ultraviolet rays, thereby making it possible to enhance the forge-preventing property of fluorescent image-printed articles.

Thus, the fluorescent substance to be included in the third fluorescent ink to be employed in the fluorescent image-printed article according to the fifth embodiment of the present invention is formed of a binuclear complex containing, as fluorescent substances, Eu and Tb which are linked to each other through a common ligand represented by the following formula (3). This binuclear complex is featured in that it is capable of emitting fluorescence having a wavelength of a first visible light region when irradiated with ultraviolet rays having a first wavelength and also capable of emitting fluorescence having a wavelength of a second visible light region differing in wavelength from the first visible light region when irradiated with ultraviolet rays having a second wavelength.

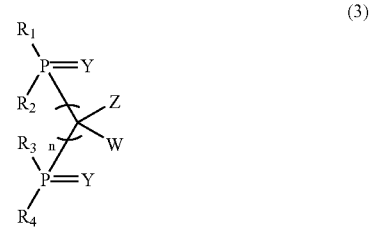

(3)

(wherein, X and Y are the same or different and are individually an element selected from the group consisting of O, S and Se; $R_1$-$R_4$ are the same or different and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from atoms of hydrogen, deuterium, halogen and an alkyl group).

As for specific examples of the binuclear complex, it is possible to use the following compounds.

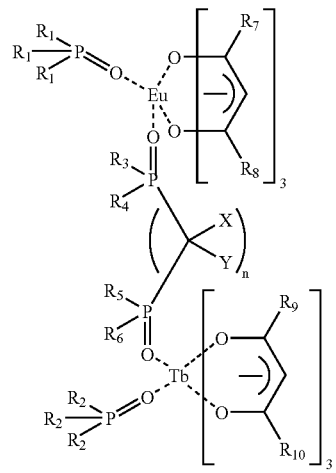

(wherein, $R_1$-$R_{10}$ may be the same or different and are individually an alkyl or alkoxy group, phenyl group, biphenyl group, naphthyl group, heterocyclic group, or substituted groups thereof; n is an integer of 2-20; and X and Y are the same or different and are individually an atom or a group selected from the group consisting of a hydrogen atom, deuterium atom, halogen atom and an alkyl group. A benzene ring or heterocyclic group may be interposed between the alkyl groups).

This binuclear complex can be obtained, for example, by concurrently mixing a phosphine oxide compound and a diphosphine oxide compound with a solution of an europium complex having a β-ketone and a terbium complex.

Specific examples of the binuclear complex include the following compounds.

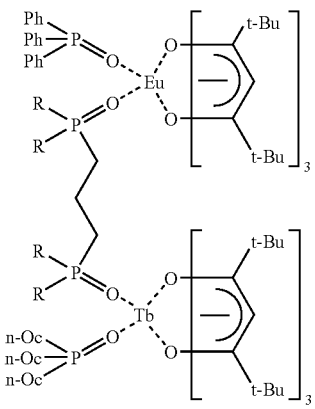

The fluorescent image-printed article according to the sixth embodiment of the present invention can be formed by making use of a fluorescent ink comprising a fluorescent substance, and ordinary coloring components to be employed in the ordinary ink. Namely, this fluorescent image-printed article includes, in addition to a pattern and letters that can be visually observed through the absorption of light by the ordinary coloring matters under visible light, information having no specific meaning or information of incomplete meaning, which is capable of giving the information through the emission of light from fluorescent substance when irradiated with a specific kind of ultraviolet rays, thereby realizing a security system.

In this case, the image can be formed by making use of a fluorescent ink together with ordinary ink containing ordinary coloring components. Examples of such image-printed articles are illustrated in FIGS. 7A-7C. As shown in FIG. 7A, this image-printed article includes a dot matrix-like image 20, wherein the region A is formed using a fluorescent ink and the region B is formed using an ordinary ink. Under visible light, a composite image 21 made up of the region A and the region B can be visually observed. However, this composite image 21 differs from the genuine information. When this image-printed article is irradiated with near-ultraviolet rays having a specific wavelength, an image 22 is made visible, thereby giving correct information.

Incidentally, when an image on the image-printed article according to the sixth embodiment of the present invention is imitated, that is, when an image 23 consisting of the regions B is formed by making use of ordinary ink as shown in FIG. 8A to thereby imitate the image 20 of FIG. 7A, it is impossible to enable the regions B to emit even if near-ultraviolet rays are irradiated thereon. Therefore, the image shown in FIG. 8A is kept unchanged as shown in FIG. 8B. Accordingly, it is easy to reveal that the image-printed article shown in FIG. 8A is a forgery.

As described above, in the case of the image-printed article according to the sixth embodiment of the present invention, it is possible, through a discrepancy between the image visible under visible light and the image to appear under the irradiation of near-ultraviolet rays, or through existence or non-existence of the watermark to be made visible by means of near-ultraviolet, to realize an excellent security system.

The image-printed article according to the seventh embodiment of the present invention is featured in that the ordinary coloring matter employed in the sixth embodiment of the present invention is replaced by a dichroic dye. When a dichroic dye is employed and the substrate is stretched to orientate the molecular axis thereof and further a polarizing plate is mounted on a detection portion of substrate, the intensity of absorption of light can be fluctuated depending on the inclined angle of the polarizing plate with the emission of a red color being made constant, thereby making it possible to fluctuate the hue according to the inclined angle of the polarizing plate.

The image-printed article according to the eighth embodiment of the present invention is featured in that the image is formed by making use of a fluorescent ink containing a dye which is capable of absorbing infra-red rays. In this case, only the image which is capable of absorbing infra-red rays and capable of emitting under the irradiation of ultraviolet rays can be determined as genuine information. For example, when a dot-like image is formed by making use of a fluorescent ink containing a dye which is capable of absorbing infra-red rays, the image can be made invisible under visible light as shown in FIG. 9A. However, when infra-red rays are irradiated onto the image, it can be made visible as shown in FIG. 9B, and further, when near-ultraviolet rays is irradiated onto the image, it can be made visible as shown in FIG. 9C. If it is found that the image can be made visible when only one of these rays is irradiated, the image-printed article can be determined as being a forgery.

The image-printed article according to the ninth embodiment of the present invention is featured in that the image is formed by making use of a fluorescent ink and an ink containing a dye which is capable of absorbing infra-red rays. One example of such an image-printed article is illustrated in FIGS. 10A-10C. As shown in FIG. 10A, this image-printed article includes a dot matrix-like image, wherein the region A is formed using a fluorescent ink and the region B is formed using an ink containing a dye which is capable of absorbing infra-red rays. Under visible light, this dot-like image can be made invisible. However, when infra-red rays are irradiated onto the image, it can be made visible as shown in FIG. 10B, and further, when near-ultraviolet rays are irradiated onto the image, it can be made visible as shown in FIG. 10C. By assuming that a pattern made up of this combination of images is a true image pattern, it is possible to obtain correct information, thereby realizing a further improved security system.

In the first, second and third fluorescent inks to be employed in the image-printed articles according to the first to ninth embodiments of the present invention, it is preferable to employ, as a binder for dispersing fluorescent substances therein, a transparent resin such as fluororesin, acrylic resin, epoxy resin, silicone resin, etc. However, there is not any particular limitation with regard to the kinds of binder.

Among these binders, fluororesin is most preferable, since it is excellent in transparency, light resistance, weather resistance and dye-solubility. In particular, when fluororesin is to be employed and a C—H bond or O—H bond is included therein, it is possible to prevent the vibration deactivation.

Especially preferable examples of fluororesin are as follows.

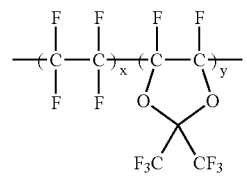

(wherein x and y are respectively an integer of 1 or more)

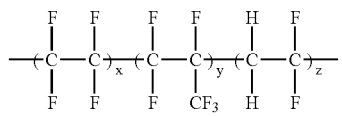

(wherein x, y and z are respectively an integer of 1 or more)

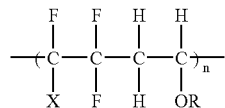

(wherein n is an integer of 1 or more; X is halogen atom; and R is alkyl group)

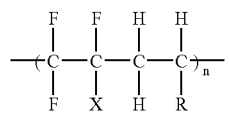

(wherein n is an integer of 1 or more; X is a halogen atom; and R is an alkyl group)

As for preferable specific examples of fluororesin, it is possible to employ Cefral Coat FG700X, A402B, A610X (Central Glass Co., Ltd.); Lumifron (Asahi Glass Co., Ltd.); Zenoa (cycloolefin)(Nippon Zeon Co., Ltd.); KYNAR, KYNAR FLEX (Atofina Japan Co., Ltd.); Deflon (Nippon Paint Co., Ltd.); and Dyneon THV(Simitomo 3M Co., Ltd.). Among these resins, Cefral Coat FG700X (acryl-branched type graft polymer) is especially excellent in transparency and in rare earth complex solubility.

As for the mixing ratio of these binder resins, it may be confined within the range of 0.5 to 30% by weight, more preferably 1 to 10% by weight based on a total weight of ink composition.

It is possible to incorporate various kinds of additives such as surfactants, dispersing agents, defoaming agents, etc. Further, the fluorescent ink may include a solvent for facilitating the coating properties. As for specific examples of the solvent, it is possible to employ alcoholic solvents, ketone-based solvents, ester-based solvents or combinations thereof.

The fluorescent ink can be employed for forming an image on a substrate by means of off-set printing or thermal transcription printing in the same manner as in the ordinary printing ink.

Next, various examples of the present invention and comparative examples will be described.

EXAMPLE 1

According to the following reaction formula (5), a rare earth complex was synthesized. Namely, as a ligand, two kinds of phosphine oxide, i.e. triphenyl phosphine oxide and trioctyl phosphine oxide are reacted with a rare earth metal compound to obtain a rare earth complex. This rare earth complex was then dissolved in Bartrel XF (fluorine-contained solvent; Du Pont Co., Ltd.) to obtain a solution. To this solution was further added 2% by weight of pellets of Dainion THV (one of fluorine-contained polymers represented by the following formula (6); Simitomo 3M Co., Ltd.) to obtain a solution (ink). The solution (ink) prepared in this manner was then coated on a glass substrate by means of spin-coating to form a layer, thereby obtaining a fluorescent image-printed article.

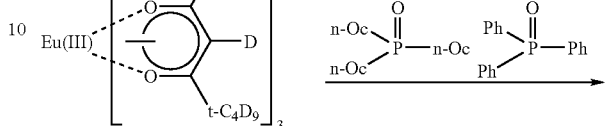
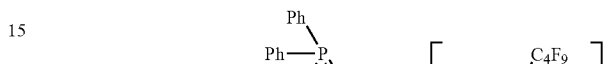
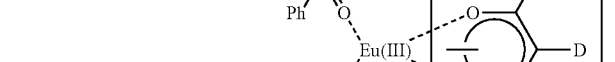
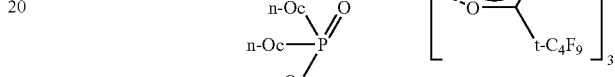
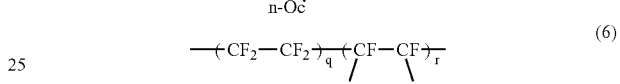

(wherein, q and r are respectively an integer; and $Rf_1$ and $Rf_2$ are individually a linear or branched alkyl group having not more than 20 carbon atoms and having in its molecule structure at least one fluorine atom).

To this fluorescent image-printed article thus obtained, black light and light from an LED having a central wavelength of 410 nm were irradiated. As a result, a strong red emission was recognized. This image was high in transparency and hence could not be visually observed unless these lights were irradiated, thus obtaining a fluorescent image-printed article excellent in security.

COMPARATIVE EXAMPLE 1

A rare earth complex was synthesized by following the same procedures as described in Example 1 except that only triphenyl phosphine oxide was employed as the phosphine oxide to be employed as a ligand in the reaction formula (5). Then, by making use of this rare earth complex, an ink and a fluorescent image-printed article were manufactured in the same manner as described in Example 1.

In the same manner as in the case of Example 1, the emission and transparency of the image of this fluorescent image-printed article were confirmed. When this fluorescent image-printed article was irradiated with black light and light from an LED having a central wavelength of 410 nm, a strong red emission was recognized. However, due to the scattering of light, it was possible to visually observe the image when these lights were not irradiated, thus failing to secure sufficient security in this fluorescent image-printed article. When the concentration of fluorescent substance was lowered, it was impossible to obtain a sufficient degree of fluorescence for the detection of image even if the fluorescent image-printed article was irradiated with black light and light from an LED having a central wavelength of 410 nm.

COMPARATIVE EXAMPLE 2

A rare earth complex was synthesized by following the same procedures as described in Example 1 except that only trioctyl phosphine oxide was employed as the phosphine oxide to be employed as a ligand in the reaction formula (5). Then, by making use of this rare earth complex, an ink and a fluorescent image-printed article were manufactured in the same manner as described in Example 1.

In the same manner as in the case of Example 1, the emission and transparency of the image of this fluorescent image-printed article were confirmed. When this fluorescent image-printed article was irradiated with black light and light from an LED having a central wavelength of 410 nm, a strong red emission was recognized. However, due to the scattering of light, it was possible to visually observe the image when these lights were not irradiated, thus failing to secure sufficient security in this fluorescent image-printed article. When the concentration of fluorescent substance was lowered, it was impossible to obtain a sufficient degree of fluorescence for the detection of image even if the fluorescent image-printed article was irradiated with black light and light from an LED having a central wavelength of 410 nm.

EXAMPLE 2

A rare earth complex was synthesized by following the same procedures as described in Example 1 except that diphosphine dioxide having a structure represented by the following formula (7) was substituted for the phosphine oxide employed as a ligand in the reaction formula (5). Then, by making use of this rare earth complex, an ink and a fluorescent image-printed article were manufactured in the same manner as described in Example 1.

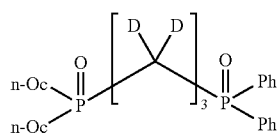

(7)

In the same manner as in the case of Example 1, the emission and transparency of the image of this fluorescent image-printed article were measured. When black light and light from an LED having a central wavelength of 410 nm were irradiated to this fluorescent image-printed article, a strong red emission was recognized. This image could not be visually observed unless these lights were irradiated, thus obtaining a fluorescent image-printed article excellent in security.

EXAMPLE 3

A rare earth complex was synthesized by following the same procedures as described in Example 1 except that diphosphine dioxide having a structure represented by the following formula (8) was substituted for the phosphine oxide employed as a ligand in the reaction formula (5). Then, by making use of this rare earth complex, an ink and a fluorescent image-printed article were manufactured in the same manner as described in Example 1.

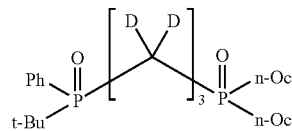

(8)

In the same manner as in the case of Example 1, the emission and transparency of the image of this fluorescent image-printed article were measured. When black light and light from an LED having a central wavelength of 410 nm were irradiated to this fluorescent image-printed article, a strong red emission was recognized. This image could not be visually observed unless these lights were irradiated, thus obtaining a fluorescent image-printed article excellent in security.

EXAMPLE 4

An ink and a fluorescent image-printed article were manufactured in the same manner as described in Example 1 except that a terbium complex (green) to be obtained from the following reaction formula (9) was employed as a rare earth complex.

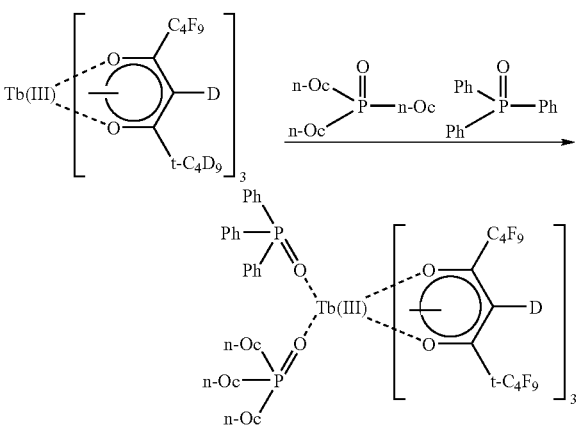

(9)

In the same manner as in the case of Example 1, the emission and transparency of the image of this fluorescent image-printed article were measured. When black light and light from an LED having a central wavelength of 410 nm were irradiated to this fluorescent image-printed article, a strong green emission was recognized. This image could not be visually observed unless these lights were irradiated, thus obtaining a fluorescent image-printed article excellent in security.

COMPARATIVE EXAMPLE 3

A rare earth complex was synthesized by following the same procedures as described in Example 1 except that diphosphine dioxide having a structure represented by the following formula (10) was substituted for the phosphine oxide employed as a ligand in the reaction formula (5). Then, by making use of this rare earth complex, an ink and a fluorescent image-printed article were manufactured in the same manner as described in Example 1.

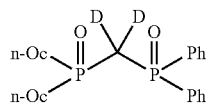

(10)

In the same manner as in the case of Example 1, the emission and transparency of the image of this fluorescent image-printed article were measured. When black light and light from an LED having a central wavelength of 410 nm were irradiated to this fluorescent image-printed article, a red emission was recognized. However, the luminosity was weak. The reason for this may be attributed to the fact that the coordination of the diphosphine dioxide was insufficient.

EXAMPLE 5

An ink and a fluorescent image-printed article were manufactured in the same manner as described in Example 1 except that a compound represented by the following formula (11) was employed as a rare earth complex.

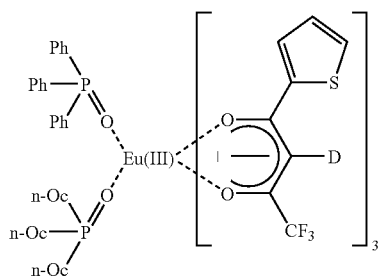

(11)

In the same manner as in the case of Example 1, the emission and transparency of the image of this fluorescent image-printed article were measured. When black light and light from an LED having a central wavelength of 410 nm were irradiated to this fluorescent image-printed article, a strong red emission was recognized. This image could not be visually observed unless these lights were irradiated, thus obtaining a fluorescent image-printed article excellent in security.

EXAMPLE 6

An ink and a fluorescent image-printed article were manufactured in the same manner as described in Example 1 except that a compound represented by the following formula (12) was employed as a rare earth complex.

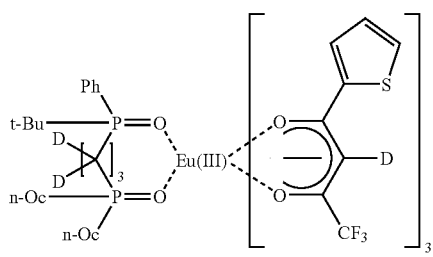

(12)

In the same manner as in the case of Example 1, the emission and transparency of the image of this fluorescent image-printed article were measured. When black light and light from an LED having a central wavelength of 410 nm were irradiated to this fluorescent image-printed article, a strong red emission was recognized. This image could not be visually observed unless these lights were irradiated, thus obtaining a fluorescent image-printed article excellent in security.

EXAMPLE 7

An europium complex represented by the following formula (13) (wherein $R_1$ is Ph; $R_2$ is n-Oc; $R_3$ is t-Bu; $R_4$ is $C_4D_9$), a terbium complex represented by the following formula (14) and a polymer represented by the following formula (15) (Dainion THV220 (trade name), Sumitomo 3M Co., Ltd.; in the formula (15), x, y and z are respectively an integer) were dissolved in ethyl acetate to prepare an ink. The ink was then spin-coated on a glass substrate to form a layer, thereby obtaining a fluorescent image-printed article. When black light was irradiated to the thin film of this fluorescent image-printed article, a yellow emission was recognized. Further, when light from a near-ultraviolet LED was irradiated to the thin film, a red emission was obtained. This image could not be visually observed unless these lights were irradiated, thus obtaining a fluorescent image-printed article excellent in security.

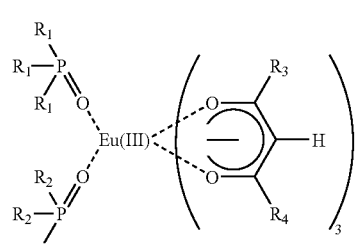

(13)

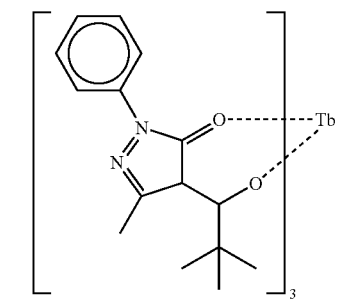

(14)

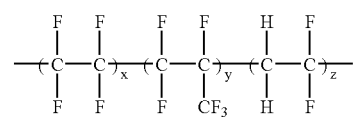

(15)

EXAMPLE 8

The europium complex and the polymer described in Example 7 were dissolved in ethyl acetate and concentrated to adjust the viscosity of the solution to prepare an ink. By means of screen printing using this ink, a bar code pattern and a matrix pattern were formed. After these patterns were dried, the europium complex and the polymer described in Example 7 were dissolved in ethyl acetate to prepare an ink and, by making use of this ink, patterns were formed in the same manner as described above, thereby obtaining fluorescent image-printed articles as shown in FIGS. 4 and 5. When black light was irradiated to these fluorescent image-printed articles, the emission of fluorescence from the entire surface thereof was recognized. Further, when light from a near-ultraviolet LED was irradiated to the fluorescent image-printed articles, a red emission was recognized only from the region of europium complex. This image could not be visually observed unless these lights were irradiated, thus obtaining a fluorescent image-printed article excellent in security.

EXAMPLE 9

By making use of the ink prepared by the methods shown in Examples 7 and 8, a region containing not only the europium complex but also the terbium complex and a region containing only the europium complex were formed, thereby obtaining fluorescent image-printed articles as shown in FIGS. 4 and 5. When black light was irradiated to these fluorescent image-printed articles, the emission of yellowish fluorescence was recognized from the entire surface thereof. Further, when light from a near-ultraviolet LED was irradiated to the fluorescent image-printed articles, a red emission was recognized only from the region of the europium complex. This image could not be visually observed unless these lights were irradiated, thus obtaining a fluorescent image-printed article excellent in security.

EXAMPLE 10

An europium complex represented by the following formula (16), a terbium complex represented by the aforementioned formula (14), diphosphine dioxide represented by the following formula (17) and a polymer represented by the aforementioned formula (15) were dissolved in ethyl acetate to prepare an ink. The ink was then spin-coated on a glass substrate to form a layer, thereby obtaining a fluorescent image-printed article. When black light was irradiated to the thin film of this fluorescent image-printed article, a yellow emission was recognized. Further, when light from a near-ultraviolet LED was irradiated to the thin film, a red emission was obtained. Since the emission of yellow as well as red fluorescence were both strong, it was assumed that the europium complex and the terbium complex were linked together through the diphosphine dioxide in the polymer. This image could not be visually observed unless these lights were irradiated, thus obtaining a fluorescent image-printed article excellent in security.

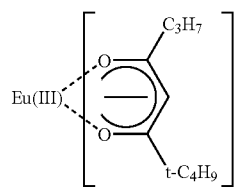

(16)

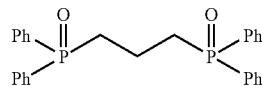

(17)

EXAMPLE 11

A fluorescent image-printed article was manufactured in the same manner as described in Example 1 except that Cefral Coat FG700X (Central Glass Co., Ltd.), which is a fluorine-contained polymer, and xylene were employed as the solvent. When black light and light from an LED having a central wavelength of 410 nm were irradiated to this fluorescent image-printed article, a strong red emission was recognized. This image could not be visually observed unless these lights were irradiated, thus obtaining a fluorescent image-printed article excellent in security.

EXAMPLE 12

A fluorescent image-printed article was manufactured in the same manner as described in Example 1 except that a fluorescent substance represented by the following formula (18) was further added and xylene was employed as the solvent. When black light and light from an LED having a central wavelength of 410 nm were irradiated to this fluorescent image-printed article, a yellow emission was recognized. This image could not be visually observed unless these lights were irradiated, thus obtaining a fluorescent image-printed article excellent in security.

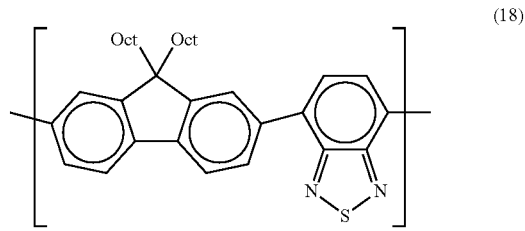

(18)

EXAMPLE 13

A fluorescent image-printed article was manufactured in the same manner as described in Example 1 except that a coloring matter (anthraquinone-based dichroic dye) consisting of SI-497 (pigment, Mitsui Chemicals Co., Ltd.) and G-176 (pigment, Hayashi Genseibutu Kagaku Research Institute) and represented by the following formula (19) was further added and xylene was employed as the solvent. The resultant fluorescent image-printed article was then stretched. When black light and light from an LED having a central wavelength of 410 nm were irradiated to this stretched fluorescent image-printed article, a red emission was recognized. It was also found out that the luminosity was weak when the transmission axis of the polarizing plate was aligned parallel with the stretched direction and that the luminosity became stronger when the transmission axis of the polarizing plate was turned perpendicular to the stretched direction. Further, when the fluorescent image-printed article was not irradiated with near-ultraviolet rays, it appeared just as an ordinary printed matter.

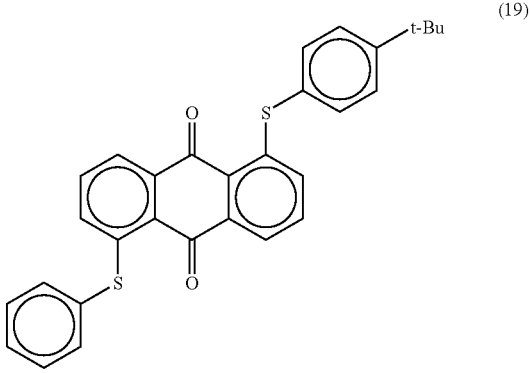

(19)

EXAMPLE 14

A fluorescent image-printed article was manufactured in the same manner as described in Example 1 except that an infra-red rays absorber YKR (Yamamoto Kasei Co., Ltd.) was further added and xylene was employed as the solvent. The absorption of infra-red rays was recognized under the irradiation of infra-red rays and a red emission was recognized under the irradiation of ultraviolet rays, thus obtaining an image-printed article which was capable of giving information under the irradiation of both infrared and ultraviolet rays, thus exhibiting excellent security. (If the image is made visual when it is irradiated with only one of infrared and ultraviolet rays, the fluorescent image-printed article will be determined as a forgery. The genuineness thereof can be determined by integrating the information to be obtained from both irradiations).

As explained above, according to the present invention, it is possible to provide a fluorescent ink and a fluorescent image-printed article to be obtained using the ink, the ink or the image of which being characterized in that it is high in luminosity under the irradiation of ultraviolet rays, is hardly recognizable under the irradiation of visible light, and is high in security level, the ink and the image-printed article being useful in the manufacture of printed matters where forgery thereof is desired to be prevented, and examples of the printed matters including securities such as notes and prepaid cards, passports, identification cards.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fluorescent image-printed article comprising a substrate, and an image formed on the substrate, wherein the image is formed from a fluorescent ink including a binder, and a first fluorescent substance and a second fluorescent substance both dispersed in the binder, both capable of emitting fluorescence as they are irradiated with ultraviolet rays, and both substantially transparent to visible light; the first fluorescent substance is an europium complex which is capable of emitting a fluorescence having a wavelength of a first visible light region when irradiated with ultraviolet rays of a first wavelength; and the second fluorescent substance is a terbium complex which is capable of emitting a fluorescence having a wavelength of a second visible light region differing in wavelength from that of the first visible light region when irradiated with ultraviolet rays of a second wavelength; at least one of the first fluorescent substance and the second fluorescent substance being formed of a europium or terbium complex containing, as a ligand, a compound represented by the following formula (1):

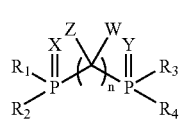

(1)

wherein, X and Y are the same or different and are individually an element selected from the group consisting of O, S and Se; $R_1$-$R_4$ are the same or different but not all of the are the same and are individually a linear or branched alkyl or alkoxy group having not more than 20 carbon atoms, a phenyl group, biphenyl group, naphthyl group, heterocyclic group, or substituted groups thereof; n is an integer of 2-20; and Z and W are the same or different and are individually an atom or a group selected from the group consisting of a hydrogen atom, deuterium atom, halogen atom and alkyl group.

2. The fluorescent image-printed article according to claim 1, wherein the binder is a fluorine-contained polymer.

3. The fluorescent image-printed article according to claim 1, wherein the first fluorescent substance and the second fluorescent substance are respectively formed of a europium or terbium complex where a compound represented by the formula (1) is employed as a ligand.

4. A fluorescent image-printed article comprising a substrate, and an image formed on the substrate, wherein the image is formed from a fluorescent ink including a binder, and a first fluorescent substance and a second fluorescent substance both dispersed in the binder, both capable of emitting fluorescence when irradiated with ultraviolet rays, and both substantially transparent to visible light; the first fluorescent substance is an europium complex which is capable of emitting a fluorescence having a wavelength of a first visible light region when irradiated with ultraviolet rays of a first wavelength; and the second fluorescent substance is a terbium complex which is capable of emitting a fluorescence having a wavelength of a second visible light region differing in wavelength from that of the first visible light region when irradiated with ultraviolet rays of a second wavelength; at least one of the first fluorescent substance and the second fluorescent substance being formed of a europium or terbium complex which is represented by the following formula (2):

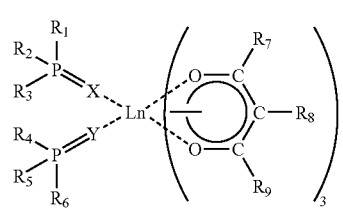

(2)

wherein, Ln is europium or terbium; X and Y are the same or different and are individually an element selected from the group consisting of O, S and Se; $R_1$-$R_6$ are the same or different but the combination of $R_1$-$R_3$ is not the same as the combination of $R_4$-$R_6$ and are individually a linear or branched alkyl or alkoxy group having not more than 20 carbon atoms, a phenyl group, biphenyl group, naphthyl group, heterocyclic group, or substituted groups thereof; $R_7$ and $R_9$ are the same or different and are individually a linear or branched alkyl or alkoxy group, a phenyl group, biphenyl group, naphthyl group, heterocyclic group, or substituted groups thereof; and R8 is a halogen atom, deuterium atom, or a linear or branched aliphatic group having 1-22 carbon atoms.

5. The fluorescent image-printed article according to claim 4, wherein the binder is a fluorine-contained polymer.

6. The fluorescent image-printed article according to claim 4, wherein the first fluorescent substance and the second fluorescent substance are respectively formed of a europium or terbium complex represented by the formula (2).

7. A fluorescent ink comprising a binder, and a fluorescent substance which is dispersed in the binder, the fluorescent substance being formed of a rare earth complex represented by the following formula (2):

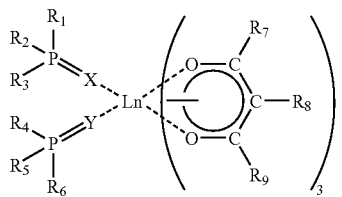

wherein, Ln is a rare earth element; X and Y are the same or different and are individually an element selected from the group consisting of O, S and Se; $R_1$-$R_6$ are the same or different but the combination of $R_1$-$R_3$ is not the same as the combination of $R_4$-$R_6$ and are individually a linear or branched alkyl or alkoxy group having not more than 20 carbon atoms, a phenyl group, biphenyl group, naphthyl group, heterocyclic group, or substituted groups thereof; $R_7$ and $R_9$ are the same or different and are individually a linear or branched alkyl or alkoxy group, a phenyl group, biphenyl group, naphthyl group, heterocyclic group, or substituted groups thereof; and $R_8$ is a halogen atom, deuterium atom, or a linear or branched aliphatic group having 1-22 carbon atoms.

8. The fluorescent image-printed article according to claim 7, wherein the binder is a fluorine-contained polymer.

* * * * *

UNITED STATES PATENT AND TRADEMARK OFFICE
CERTIFICATE OF CORRECTION

PATENT NO. : 7,575,253 B2  
APPLICATION NO. : 11/221736  
DATED : August 18, 2009  
INVENTOR(S) : Iwanaga Page 1 of 1

It is certified that error appears in the above-identified patent and that said Letters Patent is hereby corrected as shown below:

On the title page, Item (73), the Assignee's information is incorrect. Item (73) should read:

-- (73) Assignee:  Kabushiki Kaisha Toshiba, Tokyo (JP) --

Signed and Sealed this

Sixth Day of October, 2009

David J. Kappos  
*Director of the United States Patent and Trademark Office*